United States Patent
Nakao (10) Patent No.: US 10,713,710 B2
(45) Date of Patent: Jul. 14, 2020

(54) COMMODITY SELECTION ASSISTING APPARATUS

(71) Applicant: KYOCERA Document Solutions Inc., Osaka-shi, Osaka (JP)

(72) Inventor: Yukihiro Nakao, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 323 days.

(21) Appl. No.: 15/938,974

(22) Filed: Mar. 28, 2018

(65) Prior Publication Data

US 2018/0285964 A1     Oct. 4, 2018

(30) Foreign Application Priority Data

Mar. 30, 2017   (JP) ................ 2017-069060

(51) Int. Cl.
  *G06Q 30/00*   (2012.01)
  *G06Q 30/06*   (2012.01)
  *G06T 1/00*    (2006.01)
  *G06F 16/903*  (2019.01)

(52) U.S. Cl.
  CPC ... *G06Q 30/0643* (2013.01); *G06F 16/90348* (2019.01); *G06T 1/0007* (2013.01)

(58) Field of Classification Search
  CPC ............ G06Q 30/0643; G06Q 30/0621; G06F 16/90348; G06T 1/0007
  See application file for complete search history.

(56) References Cited

U.S. PATENT DOCUMENTS

2009/0222127 A1* 9/2009 Lind ............... D04B 1/22
                                            700/132
2014/0114754 A1   4/2014 Oshima
(Continued)

FOREIGN PATENT DOCUMENTS

JP      H1176268 A      3/1999
JP      2002024319 A    1/2002
(Continued)

OTHER PUBLICATIONS

Pandarum, R., and W. Yu. "Garment sizing and fit." Garment manufacturing technology. Woodhead Publishing, 2015. 187-204. (Year: 2015).*

(Continued)

*Primary Examiner* — Matthew E Zimmerman
(74) *Attorney, Agent, or Firm* — Alleman Hall Creasman & Tuttle LLP (57) ABSTRACT

The commodity selection assisting apparatus includes a camera, a size detection portion, a search portion, and a display control portion. The camera captures an object and outputs image data representing an image of the object. The size detection portion detects an object size which is a size of a specific part in the image of the object, from the image data. The search portion searches for, from among a plurality of commodity data each including commodity size data representing a size of a specific part of a commodity and commodity identification information, purchase candidate data including the commodity size data corresponding to the object size. The display control portion causes a display device to display the purchase candidate data.

5 Claims, 6 Drawing Sheets

(56) References Cited

U.S. PATENT DOCUMENTS

| | | | |
|---|---|---|---|
| 2014/0176565 A1* | 6/2014 | Adeyoola | G06T 19/006 |
| | | | 345/473 |
| 2014/0201023 A1* | 7/2014 | Tang | G06Q 30/0643 |
| | | | 705/26.5 |
| 2017/0046769 A1* | 2/2017 | Jackson | G06Q 30/0631 |
| 2017/0303616 A1* | 10/2017 | Koh | G01B 11/022 |

FOREIGN PATENT DOCUMENTS

| | | |
|---|---|---|
| JP | 2010113660 A | 5/2010 |
| JP | 2013050937 A | 3/2013 |
| JP | 2014071878 A | 4/2014 |
| JP | 20161947406 A | 11/2016 |

OTHER PUBLICATIONS

Japan Patent Office, Office Action Issued in Application No. 2017069060, dated Nov. 26, 2019, 5 pages.

* cited by examiner

COMMODITY SELECTION ASSISTING APPARATUS

INCORPORATION BY REFERENCE

This application is based upon and claims the benefit of priority from the corresponding Japanese Patent Application No. 2017-069060 filed on Mar. 30, 2017, the entire contents of which are incorporated herein by reference.

BACKGROUND

The present disclosure relates to a commodity selection assisting apparatus.

In general, persons who are to purchase commodities such as clothes, shoes, glasses, or other accessories are likely to try on a commodity that is a candidate to be purchased, and then purchase a commodity that the person likes.

In addition, it is known that a computer causes a display device to display a try-on body image obtained by superimposing a commodity image on a photograph image of a purchaser's body, thereby providing virtual trial fitting.

SUMMARY

A commodity selection assisting apparatus according to one aspect of the present disclosure includes a camera, a size detection portion, a search portion, and a display control portion. The camera captures an object and outputs image data representing an image of the object. The size detection portion detects an object size which is a size of a specific part in the image of the object, from the image data. The search portion searches for, from among a plurality of commodity data each including commodity size data representing a size of a specific part of a commodity and commodity identification information, purchase candidate data including the commodity size data corresponding to the object size. The display control portion causes a display device to display the purchase candidate data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings. The following embodiments are merely examples embodying the present disclosure, and are not intended to limit the technical scope of the present disclosure.

[Configuration of Commodity Selection Assisting Apparatus 10]

A commodity selection assisting apparatus 10 is an apparatus for assisting a user to select and purchase a commodity such as clothes, shoes, glasses, or other accessories.

Figure 1:
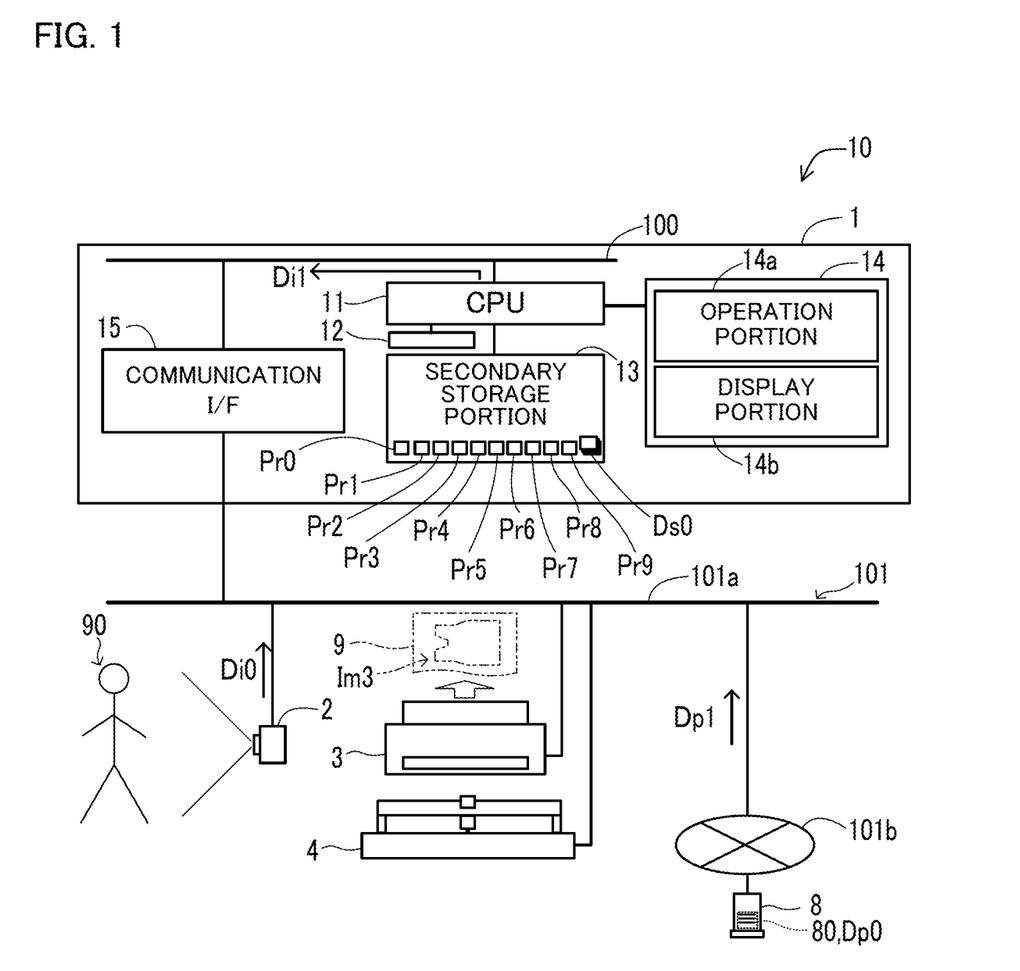
FIG. 1 is a block diagram of a commodity selection assisting apparatus according to an embodiment.

As shown in FIG. 1, the commodity selection assisting apparatus 10 includes a computer 1, a camera 2, and a printer 3.

The computer 1 is, for example, a personal computer, and is an example of an information processing apparatus. The computer 1 includes a central processing unit (CPU) 11, a random access memory (RAM) 12, a secondary storage portion 13, a user interface (I/F) 14, a communication I/F 15, and the like.

The CPU 11 is a processor that executes various calculations and data processes. The RAM 12 is a volatile computer-readable main storage portion that temporarily stores a program to be executed by the CPU 11.

The secondary storage portion 13 is a nonvolatile computer-readable storage device that stores various data and programs which the CPU 11 refers to. The secondary storage portion 13 is also a storage device from which the CPU 11 can read data and into which the CPU 11 can write data. For example, the secondary storage portion 13 may be a flash memory.

The user interface 14 includes an operation portion 14a and a display portion 14b. The operation portion 14a is a device for inputting information in accordance with a user's operation, and includes, for example, a touch panel, an operation button, and the like. The display portion 14b is a two-dimensional display device that displays information as an image, and is, for example, a liquid crystal display panel.

The CPU 11 executes a UI control program Pr0, thereby controlling the operation portion 14a and the display portion 14b of the user interface 14.

The communication I/F 15 is a device that transmits and receives data to and from another device via a communication line 101 such as a LAN 101a and Internet 101b. Further, the communication I/F 15 receives and passes data from and to the CPU 11 via a bus 100.

For example, the CPU 11 transmits print job data including image data to the printer 3 via the communication I/F 15. In addition, the CPU 11 can access a data server 8 connected to the communication line 101, via the communication I/F 15.

A storage device of the data server 8 stores a commodity database including a plurality of commodity data Dp0, in advance. The CPU 11 accesses the database of the data server 8 via the communication I/F 15 and the communication line 101.

Figure 9:
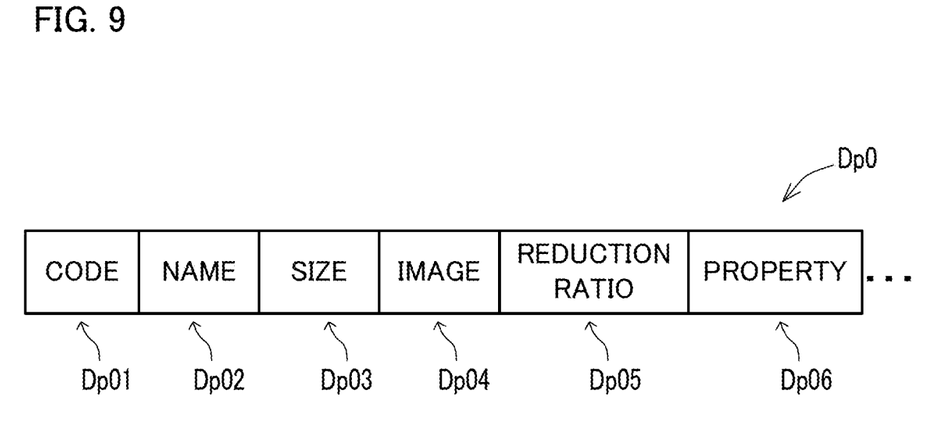
FIG. 9 shows an example of the configuration of commodity data.

As shown in FIG. 9, the plurality of commodity data Dp0 each include commodity code data Dp01, commodity name data Dp02, commodity size data Dp03, commodity image data Dp04 representing an image of a commodity, a reduction ratio Dp05 of the image, commodity property data Dp06, and the like. The commodity code data Dp01 is an example of commodity identification information.

The commodity size data Dp03 is information indicating the size of one or a plurality of predetermined specific parts of a commodity. For example, in the case where the commodity is an outer wear, the commodity size data Dp03 includes data such as a shoulder breadth, a sleeve length, a chest circumference, a waist circumference, a dress length, a neck circumference, an arm circumference, and the like.

The reduction ratio Dp05 is a reduction ratio of an image represented by the commodity image data Dp04 with respect to the actual size of the commodity. The commodity property data Dp06 may include, for example, type, performance, color, intended use, and material of a commodity.

The camera 2 captures an image of an object 90 and outputs captured image data Di0 which is image data representing the image of the object 90. For example, the object 90 is a part or the entirety of the body of the user. The object 90 may be a part or the entirety of something that the user has, e.g., a pet.

The printer 3 is a device that executes a print process for forming, on a sheet 9, an image based on image data included in the print job received from the computer 1.

As described later, the computer 1 is capable of executing a virtual try-on process for causing the display portion 14b to display a try-on image Im2 obtained by superimposing a commodity image on the photograph image of the object 90 (see FIG. 4). Thus, the user can easily confirm whether or not a commodity as a candidate to be purchased suits the object 90. In addition, it is also possible to try on a commodity that is not prepared at the store.

Here, when a commodity is tried on, it is also important to confirm whether or not the commodity as a candidate to be purchased matches the body size of a purchaser or the like. Therefore, before a commodity is tried on, it is necessary to select, as commodities that are candidates to be purchased, several commodities tentatively considered to match the body size of the purchaser or the like, from among many commodities.

However, it is troublesome to measure the detailed body sizes such as the body height, the chest circumference, and the waist of the purchaser or the like by using a measuring instrument, and search for commodities corresponding to the measurement result from among many commodities.

Even in the case where the computer 1 accesses the database of the plurality of commodity data Dp0 to search for the commodity data Dp0 corresponding to the measurement result, it takes trouble to measure the body size and input the measurement result to the computer 1.

The commodity selection assisting apparatus 10 executes a commodity selection process described later, for allowing easy selection of a commodity that matches the body size of a purchaser or the like. The commodity selection assisting apparatus 10 includes a sheet cutting device 4 to be used in the commodity selection process.

The sheet cutting device 4 is a device that receives image data from the computer 1, detects a cut-out shape from an image represented by the received image data, and cuts a sheet 9 along the cut-out shape. For example, the sheet cutting device 4 may be a well-known cutting plotter.

Specifically, the sheet cutting device 4 is capable of automatically detecting the contour shape of the image represented by the received image data, as a cut-out shape. In addition, the sheet cutting device 4 is also capable of extracting a line of a predetermined color from the image represented by the received image data and automatically detecting a shape along the extracted line as the cut-out shape.

[Commodity Selection Process]

Hereinafter, with reference to a flowchart shown in FIG. 2, an example of a procedure of the commodity selection process will be described. In the following description, S1, S2, . . . denote identification symbols of steps in the commodity selection process.

<Step S1>

In the commodity selection process, an image of an object 90 such as a human body or an animal body is captured by the camera 2. Thus, captured image data Di0 representing the image of the object 90 is transferred from the camera 2 to the CPU 11 of the computer 1 via the communication line 101. In the following description, the image of the object 90 in the captured image data Di0 is referred to as an object image Im0 (see FIG. 3).

For example, in step S1, the front view and the side view of the object 90 are captured by the camera 2. In this case, the captured image data Di0 includes data of front image data and side image data of the object 90.

In step S1, it is conceivable that capturing of the object 90 is executed with the object 90 away from the camera 2 by a predetermined reference distance. In this case, it is possible to convert the size of the object image Im0 in the captured image data Di0 to the actual size of the object 90 by using a conversion coefficient defined in accordance with the reference distance.

In step S1, it is also conceivable that the camera 2 captures the object 90 and a size reference member that are located at the same distance from the camera 2. The size reference member is a member having a known size. In this case, it is possible to calculate the conversion coefficient on the basis of the size of the image of the size reference member in the captured image data Di0 and the actual size of the size reference member. Further, it is possible to convert the size of the object image Im0 to the actual size of the object 90 by using the conversion coefficient.

<Step S2>

Next, the CPU 11 detects an object size which is the size of a specific part in the object image Im0, from the captured image data Di0.

The CPU 11 executes a size detection program Pr1 to achieve the processing in step S2. The CPU 11 executing the processing in step S2 is an example of a size detection portion.

The object size may include the body height, the shoulder breadth, the arm length, the arm circumference, the chest circumference, the waist circumference, the neck circumference, the leg length, the thigh circumference, and the like of the object 90.

The CPU 11 may automatically determine the position of a specific part for which the object size is to be detected, in accordance with a predetermined part determination rule. Alternatively, the CPU 11 may cause the display portion 14b to display the object image Im0 and set the position of the specific part in accordance with operation to the operation portion 14a.

The CPU 11 may calculate a solid part size by applying the width detected from the front image and the thickness detected from the side image, to a predetermined conversion formula. Examples of the solid part size include the arm circumference, the chest circumference, the waist circumference, the neck circumference, the thigh circumference, and the like.

<Step S3>

Next, the CPU 11 executes processing of causing the display portion 14*b* to display a search condition input screen and inputting a commodity search condition in accordance with operation to the operation portion 14*a*.

The CPU 11 executes a search condition input program Pr2 to achieve the processing in step S3.

The search condition includes, for example, information specifying the type, the color, and the like which are part of the commodity property data Dp06. Further, in the present embodiment, the search condition includes information about size margin. The size margin is information indicating a margin of the size when the object 90 puts on the commodity.

For example, the information about the size margin may be information selected from predetermined several stages of margins such as tight, standard, and loose.

It is conceivable that the type of a commodity set as a part of the search condition is the same as the type of some of things that the object 90 captured in step S1 puts on. In this case, the size margin is set using, as a reference, the thing that the object 90 captured in step S1 puts on. That is, the size margin of the thing that the object 90 captured in step S1 puts on corresponds to the standard.

The CPU 11 executing the process of inputting information about the size margin in step S3 is an example of a margin input portion.

<Step S4>

Next, the CPU 11 corrects the object size detected in step S2, in accordance with the size margin set in step S3, and sets the corrected size as a search size. The search size is a part of the search condition.

For example, if the size margin is the tight, the CPU 11 corrects the object size detected in step S2 so as to be reduced, by applying a predetermined reduction coefficient. Similarly, if the size margin is the loose, the CPU 11 corrects the object size detected in step S2 so as to be expanded, by applying a predetermined expansion coefficient. On the other hand, if the size margin is the standard, the CPU 11 does not correct the object size detected in step S2.

<Step S5>

Next, the CPU 11 accesses the database of the data server 8, and searches for and acquires one or a plurality of data that satisfy the search condition set in steps S3, S4, from among the plurality of commodity data Dp0. Hereinafter, the data acquired in this searching is referred to as purchase candidate data Dp1.

The purchase candidate data Dp1 includes the commodity size data Dp03 that satisfies the condition for the search size corresponding to the object size. In the case where the object size is corrected in accordance with the size margin in step S4, the purchase candidate data Dp1 includes the commodity size data Dp03 corresponding to the corrected object size.

The CPU 11 executes a search program Pr3 to achieve the processing in step S5. The CPU 11 executing the processing in step S5 is an example of a search portion.

<Step S6>

Next, the CPU 11 causes the display portion 14*b* to display at least a part of the one or plurality of purchase candidate data Dp1 acquired from the data server 8. The CPU 11 executes the UI control program Pr0 to achieve the processing in step S6. The CPU 11 executing the processing in step S6 is an example of a display control portion.

Figure 3:
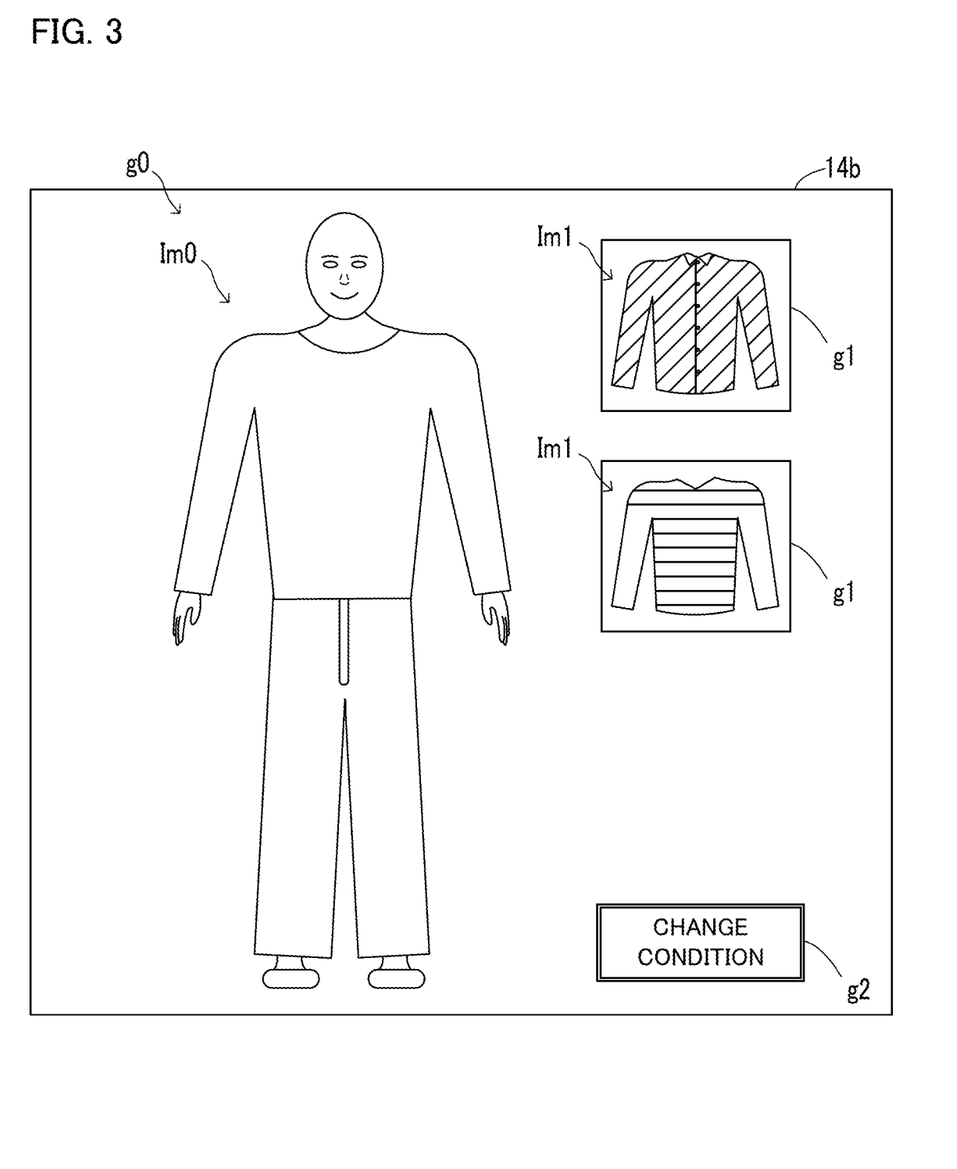
FIG. 3 shows an example of a virtual try-on screen before a try-on commodity is selected in the commodity selection assisting apparatus according to the embodiment.

FIG. 3 shows an example of a virtual try-on screen g0 to be displayed on the display portion 14*b* in step S6 by the CPU 11. The virtual try-on screen g0 includes the object image Im0 and candidate commodity images Im1. Each candidate commodity image Im1 is an image represented by the commodity image data Dp04 which is part of the purchase candidate data Dp1.

In FIG. 3, a plurality of candidate commodity images Im1 are displayed, on the display portion 14*b*, as a plurality of commodity selection icons g1 for accepting operation of selecting a commodity as a virtual try-on target.

Further, the virtual try-on screen g0 includes a condition change icon g2. The condition change icon g2 is an icon for accepting operation for shifting to processing for changing the search condition.

<Step S7>

Next, the CPU 11 selects the next processing in accordance with operation to the operation portion 14*a*. Specifically, if the condition change icon g2 on the virtual try-on screen g0 is operated, the CPU 11 shifts the process to the above step S3. It is noted that the CPU 11 executes the UI control program Pr0 to achieve the processing in step S7.

On the other hand, if the commodity selection icon g1 on the virtual try-on screen g0 is operated, the CPU 11 shifts the process to the next step S8. In the following description, the candidate commodity image Im1 corresponding to the operated commodity selection icon g1 is referred to as a selected commodity image Im10. In addition, the commodity corresponding to the operated commodity selection icon g1 is referred to as a selected commodity.

<Step S8>

Figure 4:
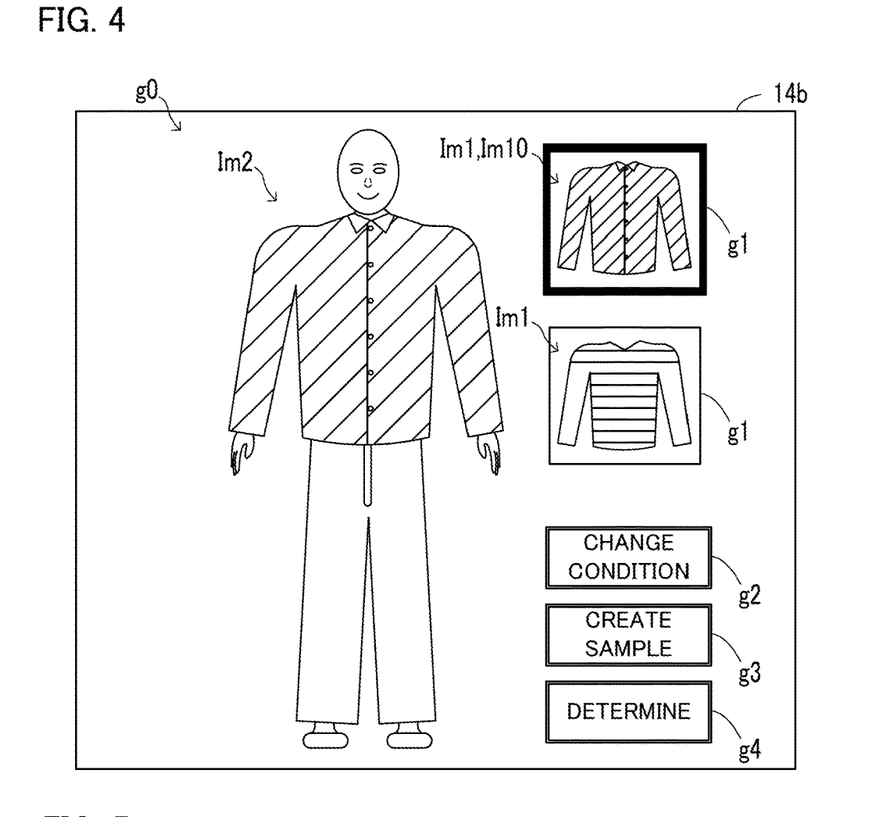
FIG. 4 shows an example of the virtual try-on screen after a try-on commodity is selected in the commodity selection assisting apparatus according to the embodiment.

In step S8, the CPU 11 causes the display portion 14*b* to display the try-on image Im2 (see FIG. 4). The try-on image Im2 is an image obtained by superimposing the selected commodity image Im10 on the object image Im0. In addition, the try-on image Im2 is an image representing a state in which the object 90 tries on the selected commodity.

The CPU 11 determines a specific part in the object image Im0 in accordance with the type corresponding to the selected commodity. Further, the CPU 11 superimposes the selected commodity image Im10 onto the determined part of the object image Im0, thereby synthesizing these images.

In addition, the CPU 11 calculates an image size adjustment ratio on the basis of the conversion coefficient used for detection of the object size and the reduction ratio Dp05 corresponding to the selected commodity. Then, the CPU 11 superimposes the image of the commodity image data Dp04 corresponding to the selected commodity on the object image Im0 such that the size of the image of the commodity image data Dp04 is adjusted in accordance with the image size adjustment ratio.

If the commodity selection icon g1 is operated, the CPU 11 further displays a sample creation icon g3 and a determination icon g4 on the virtual try-on screen g0 (see FIG. 4). The CPU 11 executes the UI control program Pr0 to achieve the processing in step S8.

<Step S9>

Next, the CPU 11 selects the next processing in accordance with operation to the operation portion 14*a*. Specifically, if the condition change icon g2 on the virtual try-on screen g0 is operated, the CPU 11 shifts the process to the above step S3. The CPU 11 executes the UI control program Pr0 to achieve the processing in step S9.

If the commodity selection icon g1 on the virtual try-on screen g0 is operated, the CPU 11 shifts the process to the above step S8. In this case, the processing in step S8 is executed for the selected commodity that has been newly selected.

If the determination icon g4 on the virtual try-on screen g0 is operated, the CPU 11 shifts the process to step S15 described later. It is noted that the determination icon g4 is an icon for determining the selection of the commodity and proceeding to an order acceptance processing.

If the sample creation icon g3 on the virtual try-on screen g0 is selected, the CPU 11 shifts the process to the next step S10. The CPU 11 executes a virtual try-on program Pr4 to achieve the processing in steps S6 to S9.

<Step S10>

In step S10, the CPU 11 acquires selection sample shape data from the secondary storage portion 13. The selection sample shape data is the one corresponding to the type of the selected commodity among a plurality of sample shape data Ds0 stored in advance in the secondary storage portion 13.

The plurality of sample shape data Ds0 are stored in the secondary storage portion 13 so as to be respectively associated with information for identifying the types of commodities. For example, the sample shape data Ds0 regarding a long-sleeved outer wear is data representing the typical shape of the long-sleeved outer wear.

Figure 8:
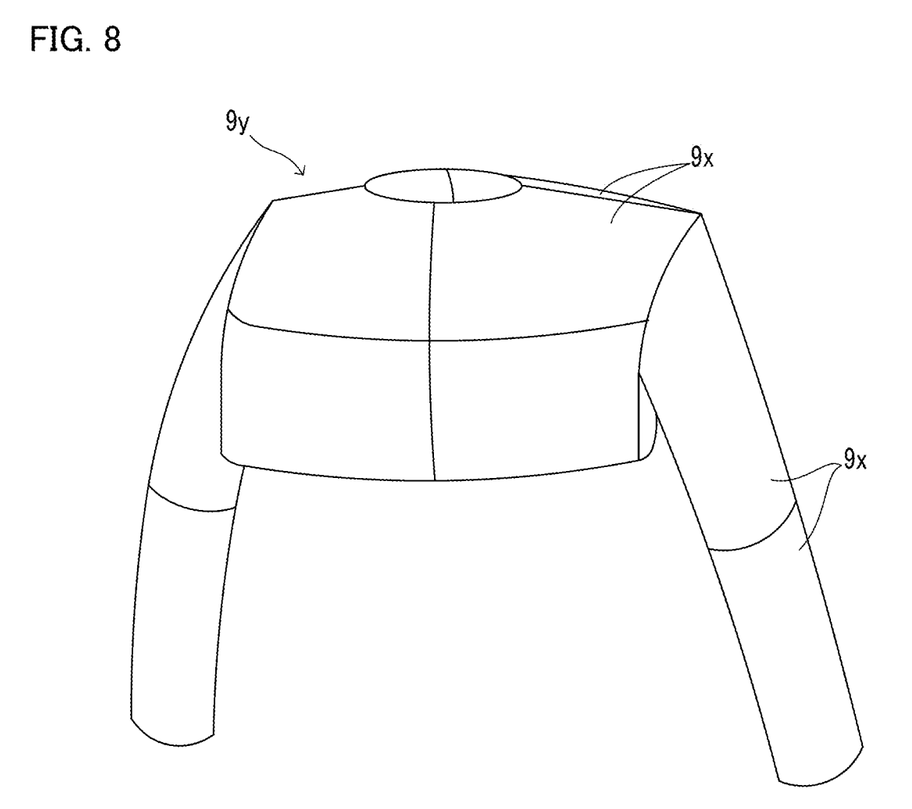
FIG. 8 is a perspective view showing an example of a commodity sample formed by connecting the plurality of divisional flexible sheets obtained by the commodity selection assisting apparatus according to the embodiment.

The plurality of sample shape data Ds0 are data respectively representing the shapes of commodity samples 9y. As shown in FIG. 8, the commodity sample 9y is a body simulating the shape of a part or the entirety of a commodity. The commodity sample 9y is composed of one sheet member or a combination of a plurality of sheet members.

The commodity sample 9y shown in FIG. 8 simulates the shape including the neck circumferential part, the chest circumferential part, and both sleeve parts of the long-sleeved outer wear.

Figure 5:
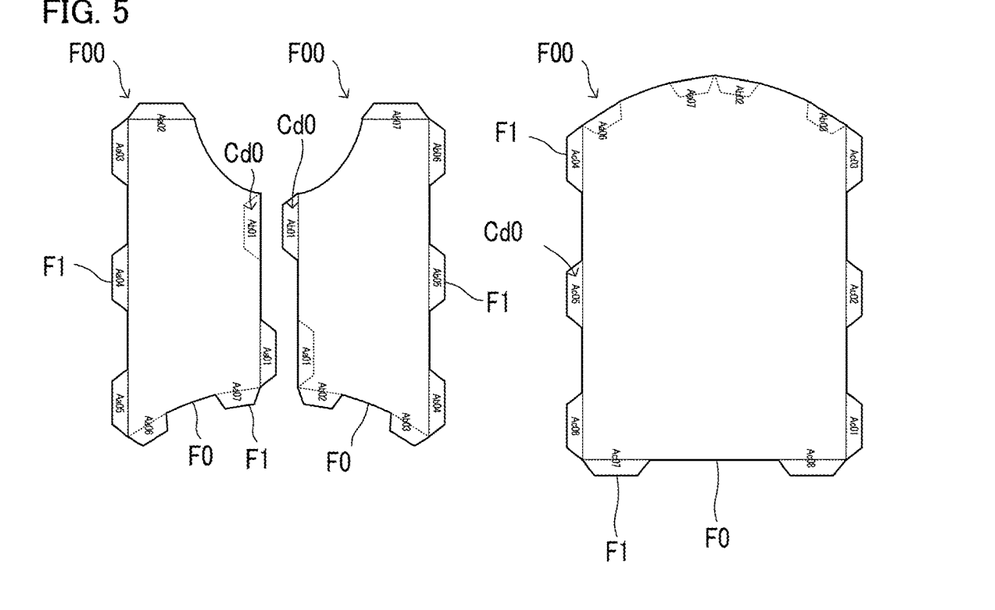
FIG. 5 shows an example of a plurality of extended divisional part shapes represented by sample shape data referred to by the commodity selection assisting apparatus according to the embodiment.

In the present embodiment, the sample shape data Ds0 includes data representing a plurality of divisional part shapes F0 which are to form the commodity sample 9y by being connected (see FIG. 5). FIG. 5 shows an example in which the sample shape data Ds0 is data representing a plurality of extended divisional part shapes F00 obtained by adding connection part shapes F1 to the plurality of divisional part shapes F0. The connection part shapes F1 are shapes of parts for connecting the plurality of divisional part shapes F0.

The plurality of divisional part shapes F0 are shapes obtained by dividing the shape of the commodity sample 9y into plural parts. The plurality of divisional part shapes F0 are formed in such a size as to fall within the maximum sheet size that can be processed by at least the printer 3 and the sheet cutting device 4, when represented in a size corresponding to the actual size of the commodity sample 9y.

Further, the sample shape data Ds0 also includes information about connection identification codes Cd0 indicating the correspondence relationship between the connection part shapes F1 and parts of the divisional part shapes F0 that are to be connected with the connection part shapes F1.

It is noted that the three extended divisional part shapes F00 shown in FIG. 5 are some of a plurality of extended divisional part shapes F00 that constitute the entire shape of the commodity sample 9y shown in FIG. 8.

In step S10, the CPU 11 may automatically select the selection sample shape data from among the plurality of sample shape data Ds0 in accordance with the type corresponding to the selected commodity. Alternatively, the CPU 11 may select the selection sample shape data from among the plurality of sample shape data Ds0 in accordance with operation to the operation portion 14a.

The CPU 11 executes a sample shape data acquiring program Pry to achieve the processing in step S10. The CPU 11 executing the processing in step S10 is an example of a sample shape data acquiring portion.

<Step S11>

Figure 6:
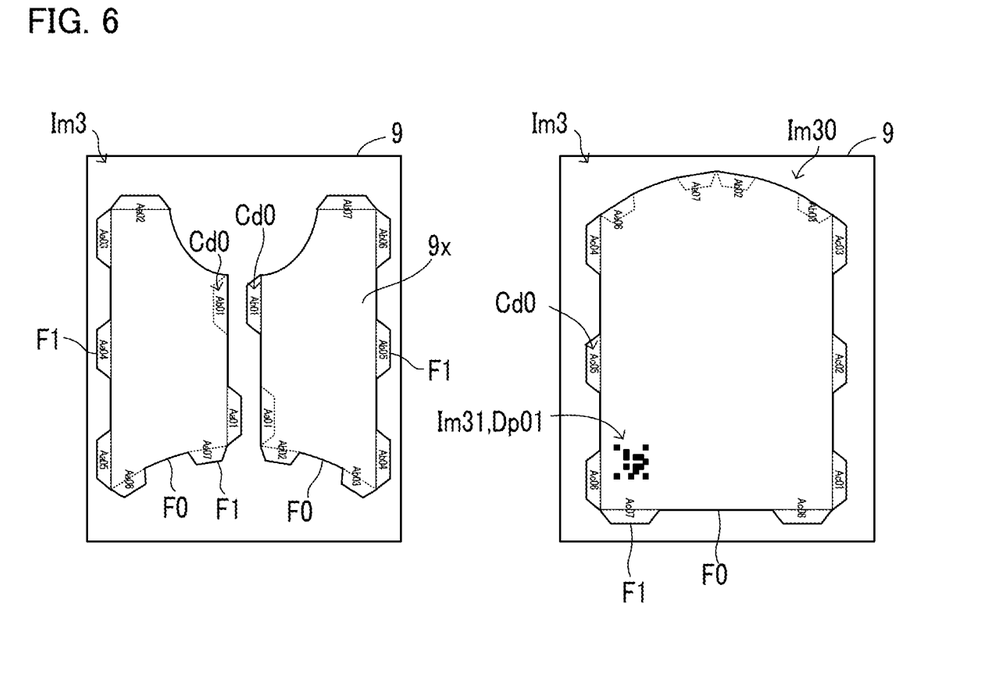
FIG. 6 shows an example of a sample image printed on a sheet by the commodity selection assisting apparatus according to the embodiment.

Next, the CPU 11 adjusts the size of the shape represented by the selection sample shape data, in accordance with the commodity size data Dp03 included in the purchase candidate data Dp1 corresponding to the selected commodity, and generates data of a sample image Im3 representing the size-adjusted shape (see FIG. 6).

The CPU 11 executes a sample image data generating program Pr6 to achieve the processing in step S11. The CPU 11 executing the processing in step S11 is an example of a sample image data generating portion.

The CPU 11 adjusts the sizes of the plurality of divisional part shapes F0 in accordance with the commodity size data Dp03 included in the purchase candidate data Dp1, and generates data of the sample image Im3 representing the shape obtained by adding the connection part shapes F1 to the size-adjusted plurality of divisional part shapes F0 (see FIG. 6).

In the present embodiment, the CPU 11 adjusts the sizes of the plurality of extended divisional part shapes F00 obtained by adding the connection part shapes F1 to the plurality of divisional part shapes F0, in accordance with the commodity size data Dp03, thereby generating data of the sample image Im3. Thus, data of the sample image Im3 representing a shape obtained by adding the connection part shapes F1 to the size-adjusted plurality of divisional part shapes F0, is generated.

It is also conceivable that data of the connection part shapes F1 are not included in the sample shape data Ds0. In this case, the CPU 11 executes processing of adding the connection part shapes F1 to the plurality of divisional part shapes F0, when generating data of the sample image Im3.

Further, data of the sample image Im3 also includes information about the connection identification codes Cd0 indicating the correspondence relationship between the connection part shapes F1 and parts of the divisional part shapes F0 that are to be connected to the connection part shapes F1.

In step S11, the CPU 11 generates data of the sample image Im3 such that a commodity code image Im31 representing the commodity code data Dp01 included in the purchase candidate data Dp1 corresponding to the selected commodity is superimposed on a part of the sample image Im3 (see FIG. 6). For example, the commodity code image Im31 may be a QR code (registered trademark) or a barcode.

<Step S12>

Next, the CPU 11 transmits the print job data including data of the sample image Im3 to the printer 3. Thus, the CPU 11 causes the printer 3 to execute print processing of forming the sample image Im3 on the sheet 9.

The CPU 11 executes a print control program Pr7 to achieve the processing in step S12.

In the case where the commodity sample 9y is a sample of a flexibly deformable commodity such as clothes, the sheet 9 may be a double-structure sheet. The double-structure sheet includes a base sheet and a flexible sheet pasted thereto so as to be able to be peeled therefrom. In this case, the printer 3 forms the sample image Im3 on the flexible sheet.

<Step S13>

Next, the CPU 11 monitors whether or not a predetermined cutting start operation is performed to the operation portion 14a. The user sets the sheet 9 on which the sample image Im3 is formed by the printer 3, in the sheet cutting device 4, and then performs the cutting start operation to the operation portion 14a.

<Step S14>

If the cutting start operation is performed to the operation portion 14a, the CPU 11 transmits data of the sample image Im3 and a cutting start command to the sheet cutting device 4. Thus, the sheet cutting device 4 cuts out a part along the shape of the sample image Im3 from the sheet 9 on the basis of data of the sample image Im3.

After executing the processing in step S14, the CPU 11 shifts the process to the above step S8. Thus, the process from the above step S8 is repeated. The CPU 11 executes a cutting control program Pr8 to achieve the processing in step S14.

The sheet members cut out from the sheet 9 by the processing in step S14 so as to have shapes represented by the sample image Im3 are a plurality of divisional sheet members respectively formed by the extended divisional part shapes F00. The base sheets are removed from the plurality of divisional sheet members, whereby a plurality of divisional flexible sheets 9x respectively formed by the extended divisional part shapes F00 are obtained (see FIG. 7).

Figure 7:
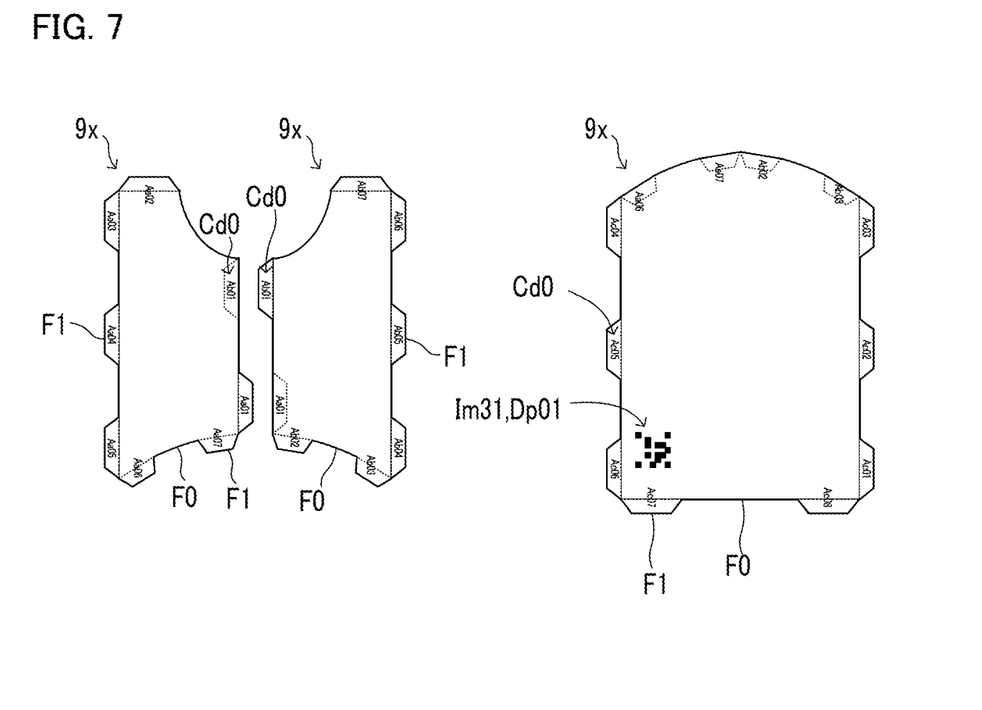
FIG. 7 shows an example of a plurality of divisional flexible sheets obtained by the commodity selection assisting apparatus according to the embodiment.

Then, the plurality of divisional flexible sheets 9x as shown in FIG. 7 are connected via the connection part shapes F1, whereby the commodity sample 9y as shown in FIG. 8 is obtained. The commodity sample 9y is formed in a size corresponding to the actual size of the selected commodity.

Therefore, if the person who is the object 90 tries on the commodity sample 9y, the person can realize whether or not the size of the selected commodity fits to the size of the person.

The commodity sample 9y shown in FIG. 8 has such a shape that the waist part and the parts below the waist part of the long-sleeved outer wear which is an example of the selected commodity are omitted. However, the commodity sample 9y may have the entire shape of the selected commodity.

It is also conceivable that the commodity sample 9y is a simple ring-shaped sheet member corresponding to the chest circumferential part or the arm circumferential part of the long-sleeved outer wear which is the selected commodity, for example. In this case, the sheet cutting device 4 cuts out a band-like sheet member, and both ends of the band-like sheet member are connected, whereby the commodity sample 9y is obtained.

<Step S15>

If the determination icon g4 on the virtual try-on screen g0 is operated, the CPU 11 executes an order acceptance processing for the selected commodity. After executing the processing in step S15, the CPU 11 finishes the commodity selection process.

The CPU 11 executes an order acceptance program Pr9 to achieve the processing in step S15. For example, the CPU 11 performs input of data of the commodity code image Im31 captured by the camera 2, and executes order acceptance processing on the basis of the commodity code data Dp01 indicated by the commodity code image Im31.

If the commodity selection assisting apparatus 10 is employed, it is not necessary to perform troublesome operations such as measuring the detailed body sizes such as the body height, the chest circumference, and the waist of the object 90 by using a measurement instrument, and searching for the commodity corresponding to the measurement result from among many commodities. In addition, it is also not necessary to perform operation of measuring the body sizes and inputting the measurement result to the computer 1.

Figure 2:
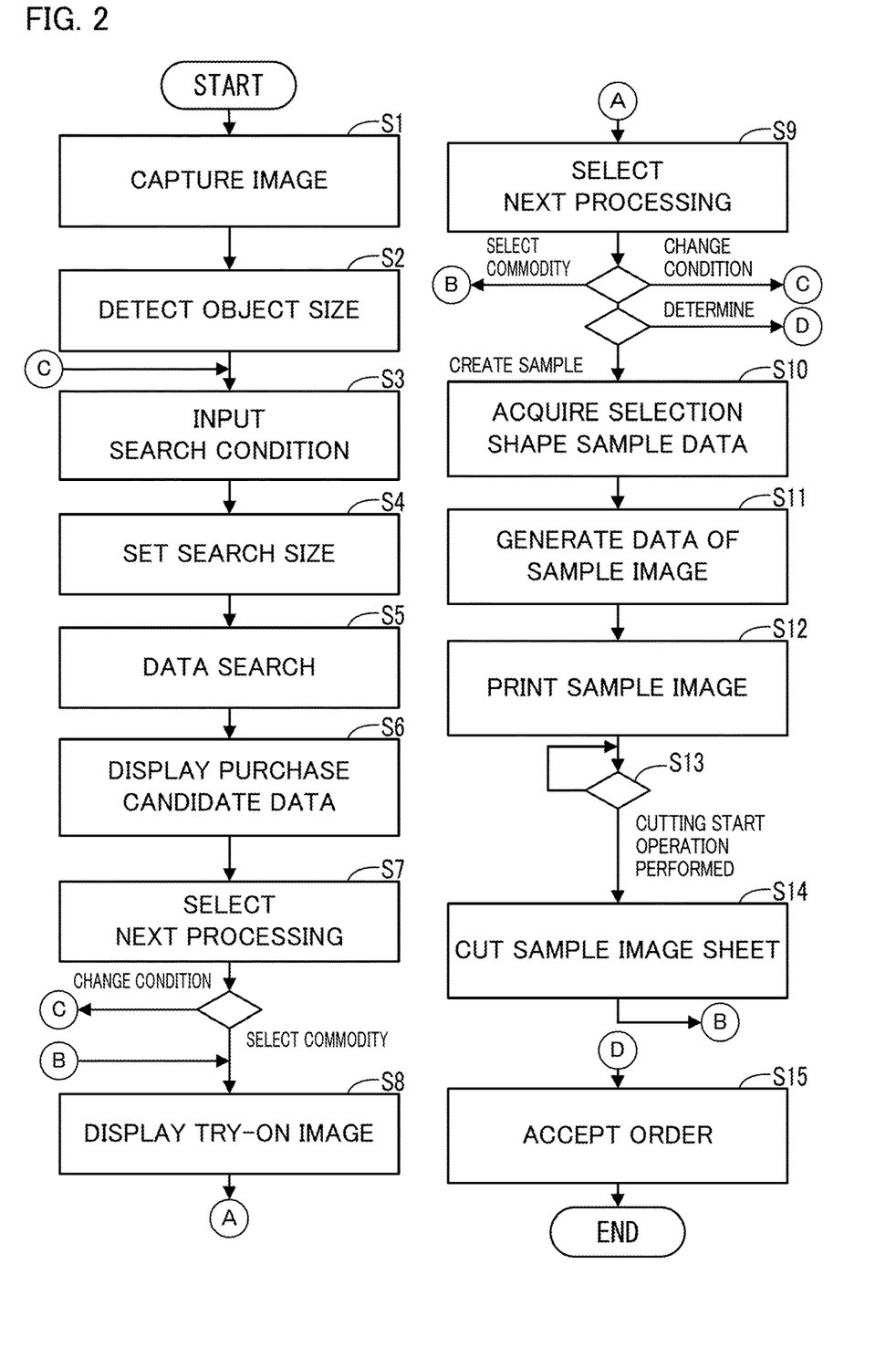
FIG. 2 is a flowchart showing an example of a procedure of a commodity selection process in the commodity selection assisting apparatus according to the embodiment.

The CPU 11 searches for the purchase candidate data Dp1 including the commodity size data Dp03 corresponding to the object size from among the plurality of commodity data Dp0 (step S5 in FIG. 2). Therefore, if the commodity selection assisting apparatus 10 is employed, it becomes possible to easily select a commodity that matches the body size of the purchaser.

In step S11 in FIG. 2, the CPU 11 generates data of the sample image Im3 representing the size-adjusted shape. Such a sample image Im3 is formed on the sheet 9, and a part along the shape of the sample image Im3 is cut out from the sheet 9, whereby the sheet-like commodity sample 9y is obtained (see FIG. 7).

By trying on the commodity sample 9y, the purchaser can easily and reliably confirm whether or not the size of the commodity corresponding to the purchase candidate data Dp1 matches the body size of the purchaser.

In the present embodiment, the sample shape data Ds0 includes data representing a plurality of divisional part shapes F0 each of which can be included within one sheet. Then, the sizes of the plurality of divisional part shapes F0 are adjusted in accordance with the commodity size data Dp03, and data of the sample image Im3 representing a shape obtained by adding the connection part shapes F1 to the size-adjusted plurality of divisional part shapes F0 is generated.

Therefore, it is possible to create a plurality of divisional sheets forming parts of the commodity sample 9y, using a general printer 3 and a general sheet cutting device 4 (see FIG. 7). The plurality of divisional flexible sheets 9x are an example of the plurality of divisional sheets. It is possible to create the commodity sample 9y by connecting the plurality of divisional sheets together.

On a part of the sample image Im3 shown in FIG. 7, the commodity code image Im31 representing the commodity code data Dp01 included in the purchase candidate data Dp1 is superimposed. Thus, it is possible to easily recognize the correspondence relationship between the commodity sample 9y put on by the purchaser and the purchase candidate data Dp1.

For example, when a clerk receives the commodity sample 9y from the purchaser, the clerk can perform, swiftly and without mistake, an order acceptance procedure for the commodity corresponding to the received commodity sample 9y on the basis of the commodity code image Im31 recorded in the received commodity sample 9y.

The object size based on the captured image data Di0 is corrected in accordance with the size margin such as tight, standard, or loose (step S4). Thus, it is possible to search for the purchase candidate data Dp1 corresponding to the corrected object size. Therefore, it is possible to search for the purchase candidate data Dp1 corresponding to the size margin that the purchaser likes.

APPLICATION EXAMPLES

In step S11 in FIG. 2, the CPU 11 may generate data of the sample image Im3 such that an image representing predetermined advertisement information is superimposed on a part of the sample image Im3. The CPU 11 executing such processing in step S11 is also an example of the sample image data generating portion.

In the case of outputting sample image Im3 including the advertisement information, it becomes possible to, for example, have the advertiser bear the cost for forming the sample image Im3 on the sheet 9.

In step S1 in FIG. 2, the object 90 and a comparison body having a known reference size may be captured by the camera 2. In this case, in step S2 in FIG. 2, the CPU 11 may detect the object size in accordance with the ratio of the size of the object image Im0 with respect to the size of the image of the comparison body.

The commodity selection assisting apparatus according to the present disclosure may be configured by freely combining the embodiments and the application examples described above, or modifying or partially omitting the embodiments and the application examples as appropriate, within the scope of the invention recited in each claim.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A commodity selection assisting apparatus comprising:
a camera configured to capture an object and output image data representing an image of the object;
a size detection portion configured to detect an object size which is a size of a specific part in the image of the object, from the image data;
a search portion configured to search for, from among a plurality of commodity data each including commodity size data representing a size of a specific part of a commodity and commodity identification information, purchase candidate data including the commodity size data corresponding to the object size;
a display control portion configured to cause a display device to display the purchase candidate data;
a sample shape data acquiring portion configured to acquire sample shape data from a nonvolatile storage portion storing in advance the sample shape data, the sample shape data representing a shape of a commodity sample simulating a shape of a part or an entirety of a commodity; and
a sample image data generating portion configured to adjust a size of the shape represented by the sample shape data, in accordance with the commodity size data included in the purchase candidate data, and generate data of a sample image representing the size-adjusted shape, wherein:
the sample shape data includes data representing a plurality of divisional part shapes which are to form the commodity sample by being connected, and
the sample image data generating portion adjusts sizes of the plurality of divisional part shapes in accordance with the commodity size data included in the purchase candidate data, and generates data of the sample image representing a shape obtained by adding, to the size-adjusted plurality of divisional part shapes, connection part shapes which are shapes of parts for connecting the plurality of divisional part shapes.

2. The commodity selection assisting apparatus according to claim 1, further comprising a sheet cutting device configured to cut out a part along the shape of the sample image from a sheet, on the basis of the data of the sample image.

3. The commodity selection assisting apparatus according to claim 1, wherein
the sample image data generating portion generates data of the sample image such that an image representing the commodity identification information included in the purchase candidate data is superimposed on a part of the sample image.

4. The commodity selection assisting apparatus according to claim 1, wherein
the sample image data generating portion generates data of the sample image such that an image representing predetermined advertisement information is superimposed on a part of the sample image.

5. The commodity selection assisting apparatus according to claim 1, further comprising a margin input portion configured to input information about a size margin in accordance with operation to an operation portion, wherein
the search portion is capable of searching for, from among the plurality of commodity data, the purchase candidate data including the commodity size data corresponding to a size obtained by correcting the object size in accordance with the size margin.

* * * * *